US010913430B2

(12) United States Patent
Belanger et al.

(10) Patent No.: US 10,913,430 B2
(45) Date of Patent: Feb. 9, 2021

(54) CAR WASH DOLLIE ASSEMBLY

(71) Applicant: WashMe Properties, LLC, Northville, MI (US)

(72) Inventors: Michael J. Belanger, Northville, MI (US); Barry S. Turner, Novi, MI (US); David L. Tognetti, Howell, MI (US)

(73) Assignee: PISTON OPW, INC., Hamilton, OH (US)

( * ) Notice: Subject to any disclaimer, the term of this patent is extended or adjusted under 35 U.S.C. 154(b) by 43 days.

(21) Appl. No.: 15/941,453

(22) Filed: Mar. 30, 2018

(65) Prior Publication Data

US 2018/0281751 A1 Oct. 4, 2018

Related U.S. Application Data

(60) Provisional application No. 62/479,832, filed on Mar. 31, 2017.

(51) Int. Cl.
*B60S 3/00* (2006.01)
*B65G 19/22* (2006.01)

(52) U.S. Cl.
CPC ............ *B60S 3/004* (2013.01); *B65G 19/225* (2013.01); *B65G 2201/0294* (2013.01)

(58) Field of Classification Search
CPC .................. B60S 3/004; B65G 19/225; B65G 2201/0294
USPC ...................................................... 104/173.2
See application file for complete search history.

(56) References Cited

U.S. PATENT DOCUMENTS

| 4,864,936 | A  | * | 9/1989  | Rietsch, Jr. | B60S 3/004 104/172.1 |
| 5,001,988 | A  | * | 3/1991  | Agathos | B60S 3/004 104/172.3 |
| 5,140,910 | A  | * | 8/1992  | Welter | B60S 3/004 104/162 |
| 6,186,073 | B1 | * | 2/2001  | Reitsch, Jr. | B60S 3/004 104/162 |
| 7,243,605 | B1 | * | 7/2007  | Belanger | B60S 3/004 104/172.1 |
| 8,113,124 | B2 | * | 2/2012  | Smock | B61B 10/04 104/162 |
| 8,161,888 | B2 | * | 4/2012  | Balash | B60S 3/004 104/165 |
| 8,393,461 | B2 | * | 3/2013  | Balash | B60S 3/004 104/172.3 |
| 9,416,577 | B2 | * | 8/2016  | Fazio | E05F 1/1033 |
| 9,475,467 | B2 | * | 10/2016 | MacNeil | B60S 3/004 |

(Continued)

*Primary Examiner* — Jason C Smith
(74) *Attorney, Agent, or Firm* — Dickinson Wright, PLLC

(57) ABSTRACT

A dollie assembly for a vehicle wash includes a center link configured for attachment to a drive mechanism of the vehicle wash and having a throughhole with a first bushing extending therethrough along an axis between opposite ends with cylindrical bearing surfaces on opposite sides of the center link. A tire pushing roller is disposed on each of the bearing surfaces for rotation about the axis. A pair of track rollers are supported for rotation about the axis. The track rollers are disposed on an opposite side of the pair of tire pushing rollers from one another such that the pair of tire pushing rollers are between the pair of track rollers. The pair of track rollers are rotatable about the axis independently from pair of tire pushing rollers.

26 Claims, 5 Drawing Sheets

(56) References Cited

U.S. PATENT DOCUMENTS

2010/0242785 A1* 9/2010 Turner .................... B60S 3/004
                                                    104/172.3
2018/0281751 A1* 10/2018 Belanger ................. B60S 3/004

* cited by examiner

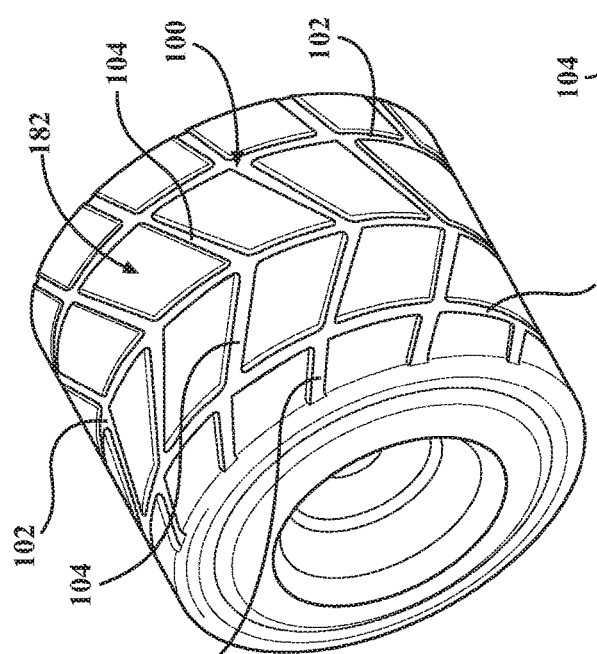
FIG. 5
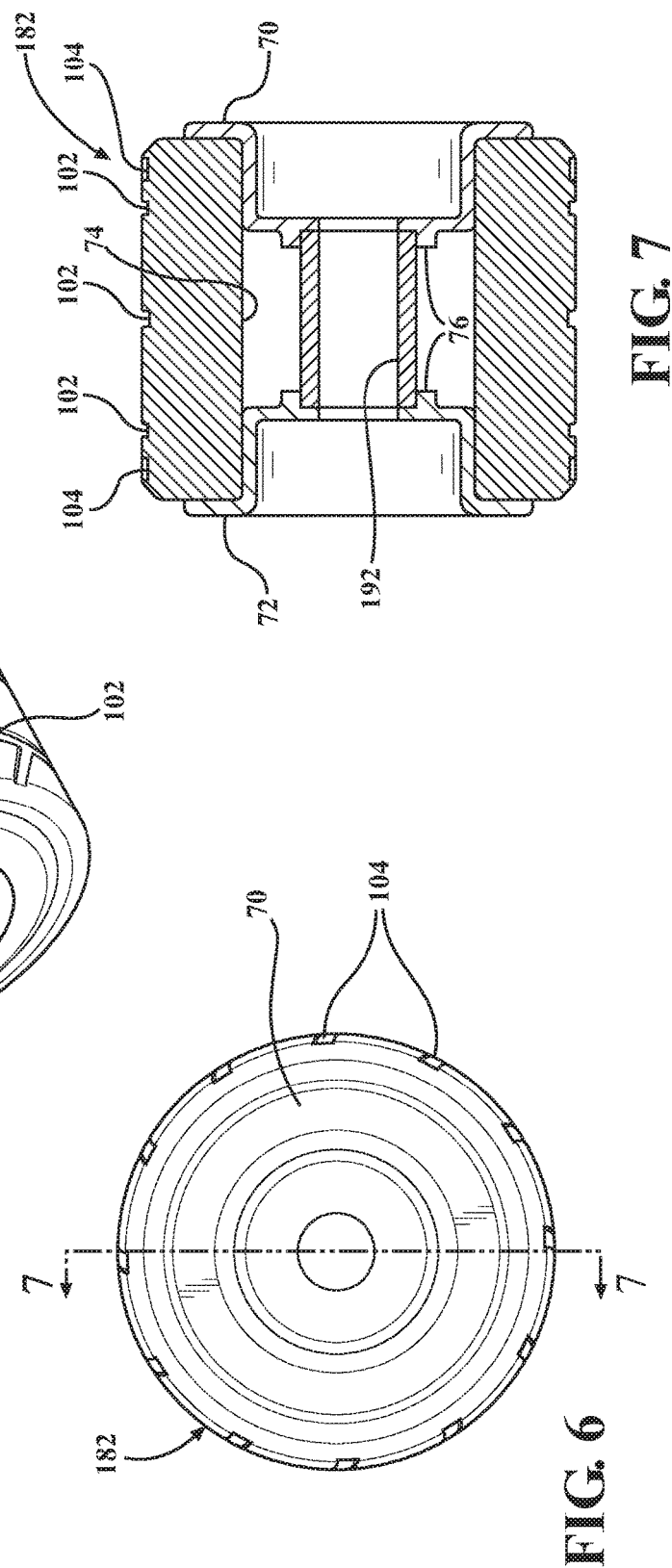
FIG. 7
FIG. 6

CAR WASH DOLLIE ASSEMBLY

CROSS-REFERENCE TO RELATED APPLICATION

This application claims the benefit of U.S. Provisional Application Ser. No. 62/479,832, filed Mar. 31, 2017, which is incorporated herein by reference in its entirety.

TECHNICAL FIELD

The present disclosure relates generally to the field of auto-laundry systems. More particularly, the present disclosure relates to a car wash that includes an endless loop chain conveyor that links a plurality of car-pusher dollies that roll along tracks to push a vehicle through the car wash system.

BACKGROUND OF THE DISCLOSURE

Certain auto-laundry systems, otherwise popularly referred to as "car washes," use endless chain conveyors of the type having "dollies" linked into the continuous-loop chain of a conveyor at regular intervals. The dollies are selected, as needed, to push vehicles along a track by engaging tires of the vehicles. The dollies are connected to the continuous-loop chain by a center link.

The track, which is used in combination with the continuous-loop chain and the dollies, typically comprises three separate tracks configured in parallel relation with one another, with the separate tracks being disposed at different levels with respect to a floor of the car wash. The separate tracks commonly include an uppermost, top level track oriented generally flush with the car wash floor to accommodate the tires of the vehicle being washed. The top level track serves to define the travel path for dollies which are "selected" from amongst all the dollies, at an appropriate time when the vehicle to be washed is staged in position, to engage and push tires of the vehicle along the top level track and through the car wash process. The separate tracks further include an intermediate level track that provides a continuation or "forward" track for unselected dollies to continue to move forward on the continuous-loop chain. The separate tracks further yet include a lowermost, bottom level track that serves to provide a return path for the dollies. A selector is used to transfer the selected dollies from the intermediate level track to the top level track when a vehicle is present and ready to be conveyed through the car wash.

Conventional dollies generally utilize a steel axle member in the form of a steel bolt having a threaded end which receives a nut. A center link is mounted onto the axle member to effectuate a connection of the dollie to the endless loop chain. On either side of the center link is mounted a pair of wheels which can rotate on the axle member. The first, inner wheels, adjacent the center link, can have a larger diameter for engaging and pushing the vehicle tires. The second, outer wheels may be configured to engage and ride along the tracks. Other dollies may employ a third stabilizing wheel on either side of the center link.

The track wheels of conventional dollies are generally constructed of an inexpensive polymer material such as ultra-high molecular-weight polyethylene ("UHMH"). The types of polymers employed are generally light-weight and soft such that they are susceptible to rocks, dirt and/or other debris, which are known to be prevalent in a car wash, becoming embedded therein. The embedded material in the track wheels, as well as the fact that the tracks can become covered with dirt and hard particles (also referred to jointly as debris), can cause the track wheels to slide and skid on the tracks, rather than roll as intended. When this occurs, the embedded debris in the track wheels and debris on the tracks can cause significant wear to the track surfaces when the track wheels skid or slide therealong as opposed to rolling. The constant frictional rubbing between hard particles of the debris and the tracks can slowly abrade the upper surface of the tracks, such that the tracks eventually require replacement due to their diminished integrity for supporting the weight of a vehicle. Further yet, the roughened surface of the tracks can also compromise the smooth travel of the dollies therealong, which can cause the dollies to be sporadically hung-up and can also cause wear to the dollies. Replacing the track assembly, and potentially dollies, of a conveyor system is a very costly endeavor in terms of both the capital expenditure involved as well as the lost revenue from the car wash being out of service during the time required for replacement.

Accordingly, there is a need for an improved dollie and track wheels thereof that addresses at least the issues discussed above.

SUMMARY OF THE DISCLOSURE

It is therefore an aspect of the present disclosure to provide an improved dollie assembly for a car wash that has increased longevity compared to prior dollie assemblies.

It is another aspect of the present disclosure to provide an improved vehicle dollie assembly for a vehicle wash that yields decreased costs compared to prior dollie assemblies.

It is still another aspect of the present disclosure to provide a dollie assembly for a vehicle wash that provides improved performance compared to prior dollie assemblies.

It is yet another aspect of the present disclosure to provide a dollie assembly for a vehicle wash that decreases wear on the conveyor system, including its tracks.

In accordance with the above and other aspects of the present disclosure, a dollie assembly for a vehicle wash in accordance with a non-limiting aspect includes a center link having a first connecting portion configured for attachment to a drive mechanism of the vehicle wash and a second connection portion having a throughhole, with a first bushing disposed in the throughhole, wherein the first bushing extends along a central axis between opposite ends and has cylindrical bearing surfaces on opposite sides of the center link. A pair of tire pushing rollers having a first diameter are provided, with one of the tire pushing rollers being disposed on one of the bearing surfaces for rotation about the central axis on one side of the center link and the other of the tire pushing rollers being disposed on the other of the bearing surfaces for rotation about the central axis on the other side of the center link. A pair of track rollers having a second diameter less than said first diameter, said pair of track rollers being supported for rotation about said central axis, each of said track rollers being disposed on an opposite side of said pair of tire pushing rollers from one another such that said pair of tire pushing rollers are between said pair of track rollers, wherein said pair of track rollers are rotatable about said central axis independently from said pair of tire pushing rollers.

In accordance with another aspect, the pair of tire pushing rollers can be provided to be rotatable independently from one another and the pair of track rollers can be provided to be rotatable independently from one another, thereby providing rolling independence that results in reduced wear and reduced tire sliding/skidding, thus, reducing the wear to the tracks along which the track rollers ride.

In accordance with another aspect, the first bushing can be provided having a through passage extending along the central axis and a first axle member can be disposed through the through passage, with the first axle member being configured to rotate relative to the first bushing.

In accordance with another aspect, second bushings can be disposed in the pair of track rollers, with the second bushings being configured to co-rotate with the first axle member.

In accordance with another aspect, the pair of track rollers have inner sides facing the tire pushing rollers, wherein each of the inner sides can be provided having a counterbore, and each of the opposite ends of the first bushing can be disposed in a separate one of the counterbores, wherein the pair of track rollers can be maintained in clearance relation with the first bushing to minimize dynamic friction in use.

In accordance with another aspect, seal members can be disposed between an outer surface the first bushing and an inner surface of each of the counterbores to prevent the ingress of fluid and debris into the rolling components.

In accordance with another aspect, the pair of track rollers can be provided having a tread pattern to facilitate avoidance of debris from becoming embedded in the track rollers.

In accordance with another non-limiting aspect, a dollie assembly for a vehicle wash is provided including a center link having a first connecting portion configured for attachment to a drive mechanism of the vehicle wash and a second connection portion having a throughhole with a first bushing fixed in the throughhole against relative movement with the center link. The first bushing can be provided having a through passage extending along a central axis between opposite ends and having cylindrical bearing surfaces on opposite sides of the center link. An axle member can be disposed through the through passage and a pair of tire pushing rollers having a first diameter can be provided, with one of the tire pushing rollers being disposed on one of the bearing surfaces for rotation about the central axis on one side of the center link and the other of the tire pushing rollers being disposed on the other of the bearing surfaces for rotation about the central axis on the other side of the center link. A pair of track rollers having a second diameter less than said first diameter can be provided, with the pair of track rollers being supported for rotation about the axle member and about the central axis. Each of the track rollers can be disposed on an opposite side of the pair of tire pushing rollers from one another such that the pair of tire pushing rollers are between the pair of track rollers, wherein the pair of track rollers are rotatable about the central axis independently from the pair of tire pushing rollers.

In accordance with another non-limiting aspect, a dollie assembly for a vehicle wash is provided including a center link having a first connecting portion configured for attachment to a drive mechanism of the vehicle wash and a second connection portion having a throughhole, with a first bushing fixed in the throughhole against relative movement with the center link. The first bushing can be provided having a through passage extending along a central axis between opposite ends and having cylindrical bearing surfaces on opposite sides of the center link. A hollow first axle member can be disposed through the through passage and a pair of tire pushing rollers having a first diameter can be provided, with one of the tire pushing rollers being disposed on one of the bearing surfaces for rotation about the central axis on one side of the center link and the other of the tire pushing rollers being disposed on the other of the bearing surfaces for rotation about the central axis on the other side of the center link. A second axle member can be disposed through the first axle member, and a pair of track rollers having a second diameter less than said first diameter can be provided, with the pair of track rollers being supported for rotation on the second axle member and about the central axis. Each of the track rollers can be disposed on an opposite side of the pair of tire pushing rollers from one another such that the pair of tire pushing rollers are between the pair of track rollers, wherein the pair of track rollers are rotatable about the central axis independently from the pair of tire pushing rollers.

BRIEF DESCRIPTION OF THE DRAWINGS

Other aspects of the present disclosure will be readily appreciated, as the same becomes better understood by reference to the following detailed description when considered in connection with the accompanying drawings where:

FIG. 5 is a perspective view of a track engaging roller for a vehicle wash dollie assembly according to an aspect of the present disclosure;

FIG. 6 is a side view of the track engaging roller of FIG. 5; and

FIG. 7 is a cross-sectional view of the track engaging roller of FIG. 6 as viewed in the direction of the arrows 7-7.

DETAILED DESCRIPTION OF THE DISCLOSURE

Figure 1:
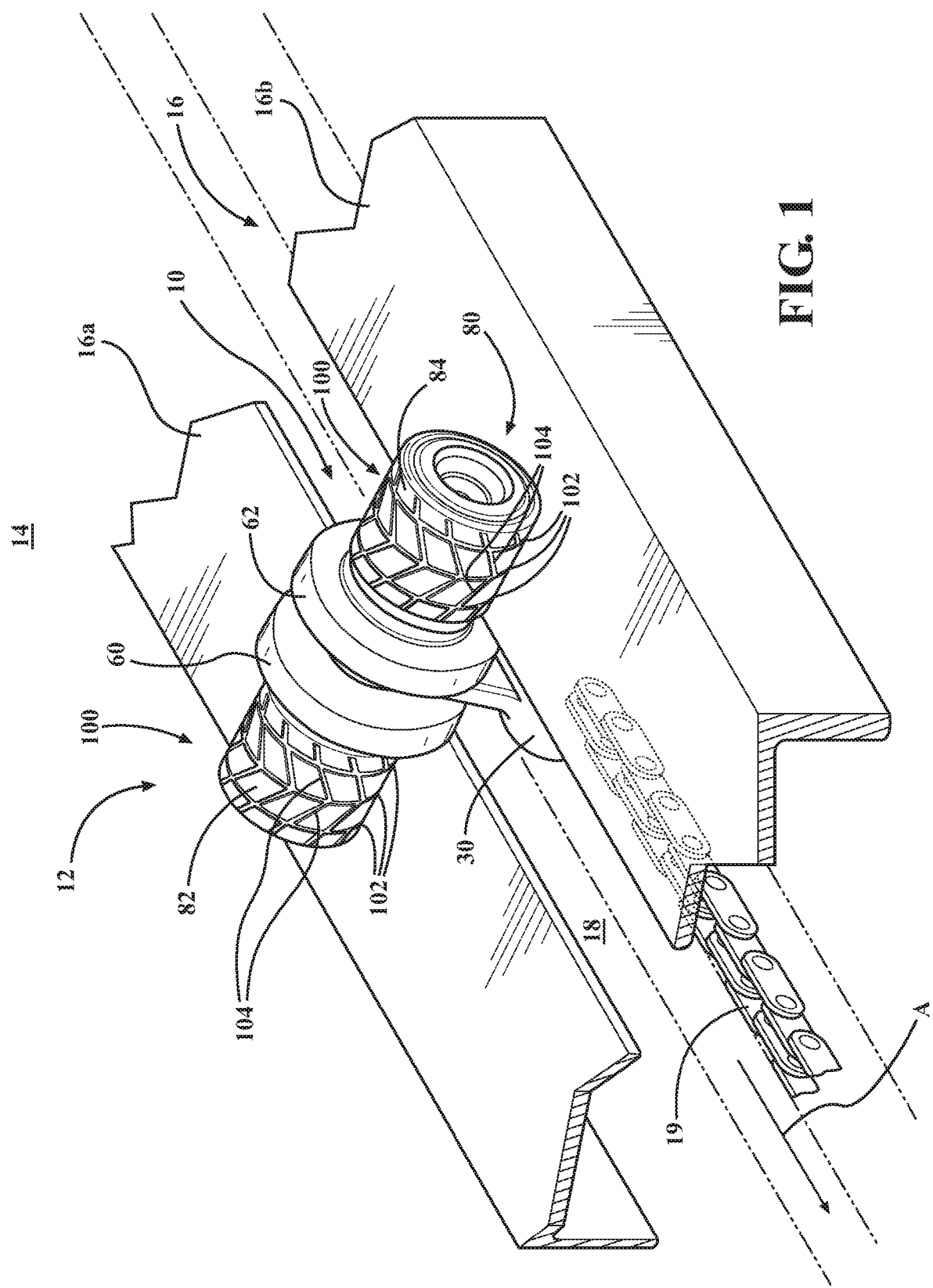
FIG. 1 is a schematic perspective illustration of a dollie assembly as part of a conveyor system for a vehicle wash in accordance with an aspect of the present disclosure.

Detailed aspects of the present disclosure are described herein; however, it is to be understood that the disclosed aspects are merely exemplary and may be embodied in various and alternative forms. It is not intended that these examples illustrate and describe all possible forms of the disclosure. Rather, the words used in the specification are words of description rather than limitation, and it is to be understood that various changes may be made without departing from the spirit and scope of the disclosure. As those of ordinary skill in the art will understand, various features of the present disclosure are illustrated and described with reference to the Figures and may be combined with features illustrated in one or more other Figures to produce aspects of the present disclosure that are not explicitly illustrated or described in any individual drawing. The combinations of features illustrated provide representative examples for typical applications. However, various combinations and modifications of the features consistent with the teachings of the present disclosure may be desired for particular applications or implementations.

Referring now to the FIGs, the present disclosure relates to an improved dollie assembly 10 for a conveyor system 12 of a vehicle wash, referred to hereafter as car wash 14. As schematically shown, the conveyor system 12 can include an upper track 16, an intermediate track (not shown) disposed below the upper track 16, and a lower track (not shown). The upper track 16 can include a slot 18 in which the dollie assembly 10 can travel, as discussed in more detail herein.

The slot 18 can serve to divide the upper track 16 into two sections generally designated by reference numbers 16a, 16b. According to an aspect, the conveyor system 12 can include a variety of other features including a continuous-loop chain 19, support assemblies and cross-beams which are not specifically shown. According to an aspect, a plurality of dollie assembles 10 may be attached to the chain 19 to ride along the tracks 16a, 16b as the chain 19 moves through its endless loop. It will be appreciated that the configuration and components, other than the dollie assemblies 10, of the conveyor system 12 can vary and are not critical to the disclosure herein. It will further be appreciated that conveyor systems for vehicle wash systems are well known and such suitable conveyor systems can be employed as part of the aspects of the disclosure herein as the disclosure herein relates to the configuration of the dollie assemblies 10.

According to an aspect, in operation, a vehicle (not shown) can enter the car wash 14 with its tires resting on the upper track 16. More specifically, in accordance with a slotted-track vehicle wash system according to an aspect of the disclosure, each tire of the vehicle spans across adjacent tracks. Thus, for example, the vehicle tires can typically be placed on tracks 16a, 16b during the vehicle wash process. As discussed above, the conveyor system 12 can include the conveyor chain 19 that may run under the gap or slot 18 between adjacent tracks 16a, 16b. The dollie assemblies 10, coupled to the conveyor chain 19, that are selected can extend up through the slot 18 into engagement with the vehicle tires to push the tires, and thus the vehicle, along the upper track 16 as it is conveyed through the vehicle wash process in the direction of vehicle travel as indicated by arrow A. Unselected dollie assemblies 10 will continue to move in coupled relation with the conveyor chain 19 along the intermediate track in the direction of vehicle travel A beneath the upper track 16a, 16b, as is well known in the art.

Figure 2:
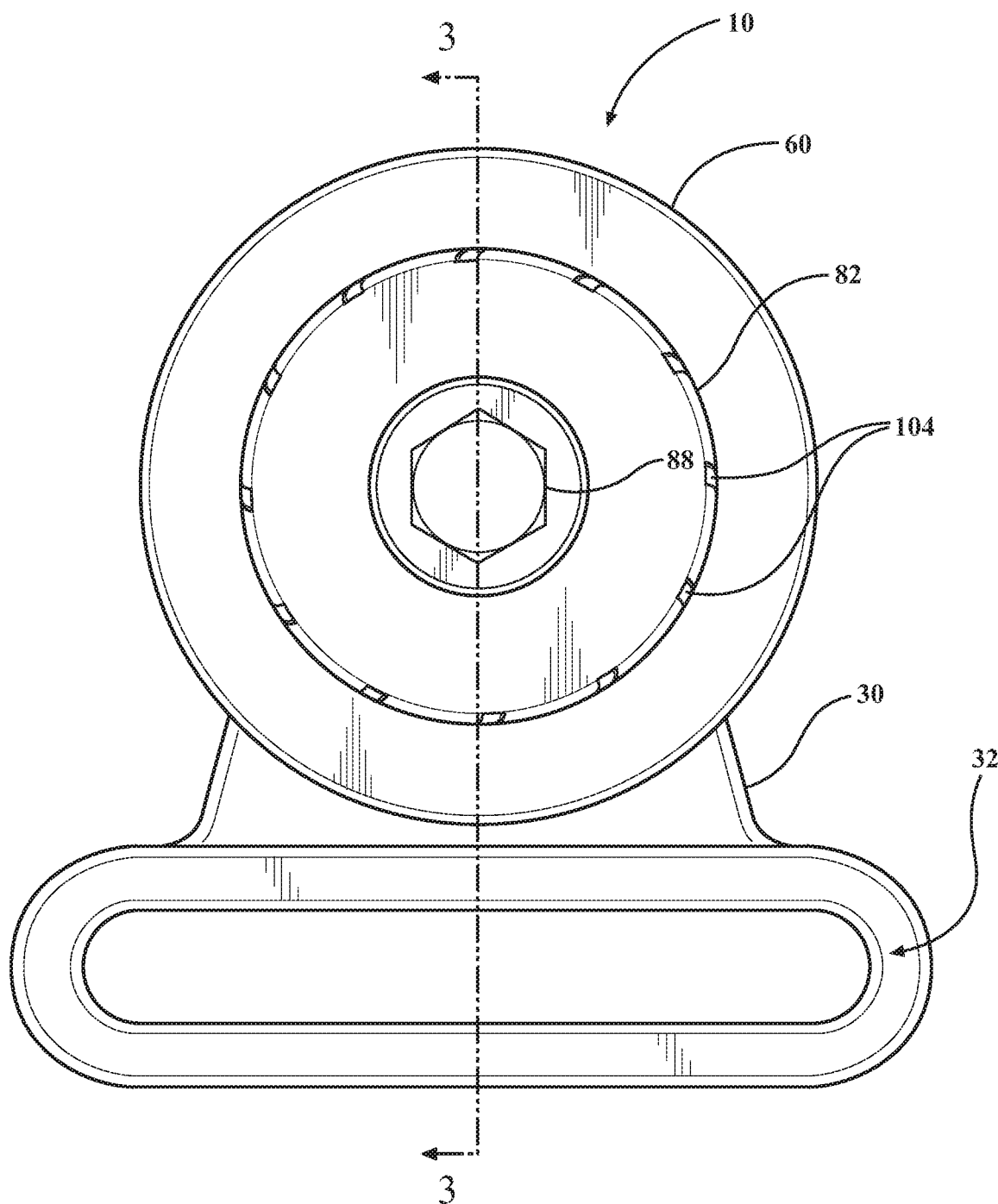
FIG. 2 is a side view of a dollie assembly for a vehicle wash in accordance with an aspect of the present disclosure.
Figure 3:
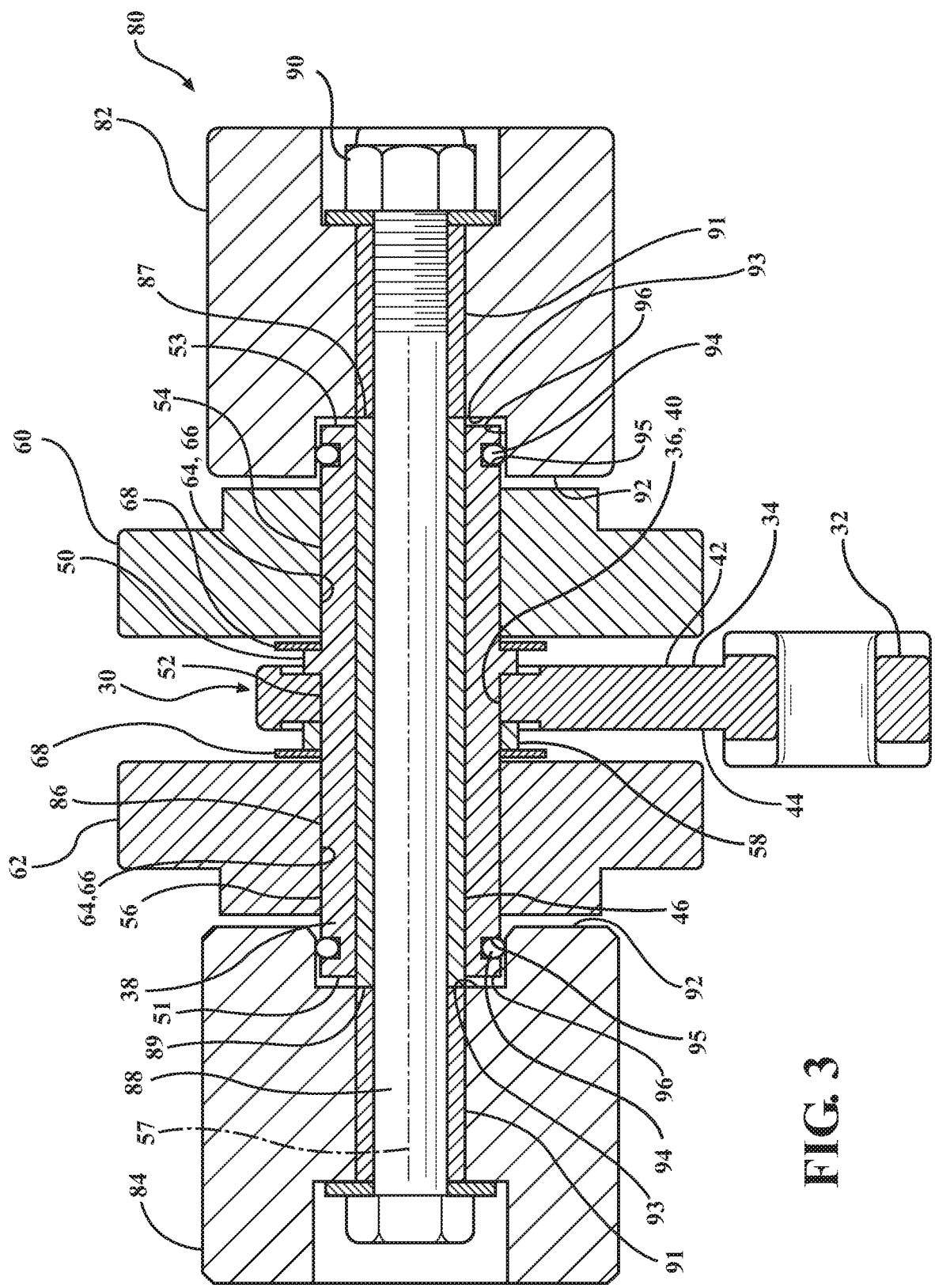
FIG. 3 is a cross-sectional view of the dollie assembly of FIG. 2 as viewed in the direction of the arrows 3-3.
Figure 4:
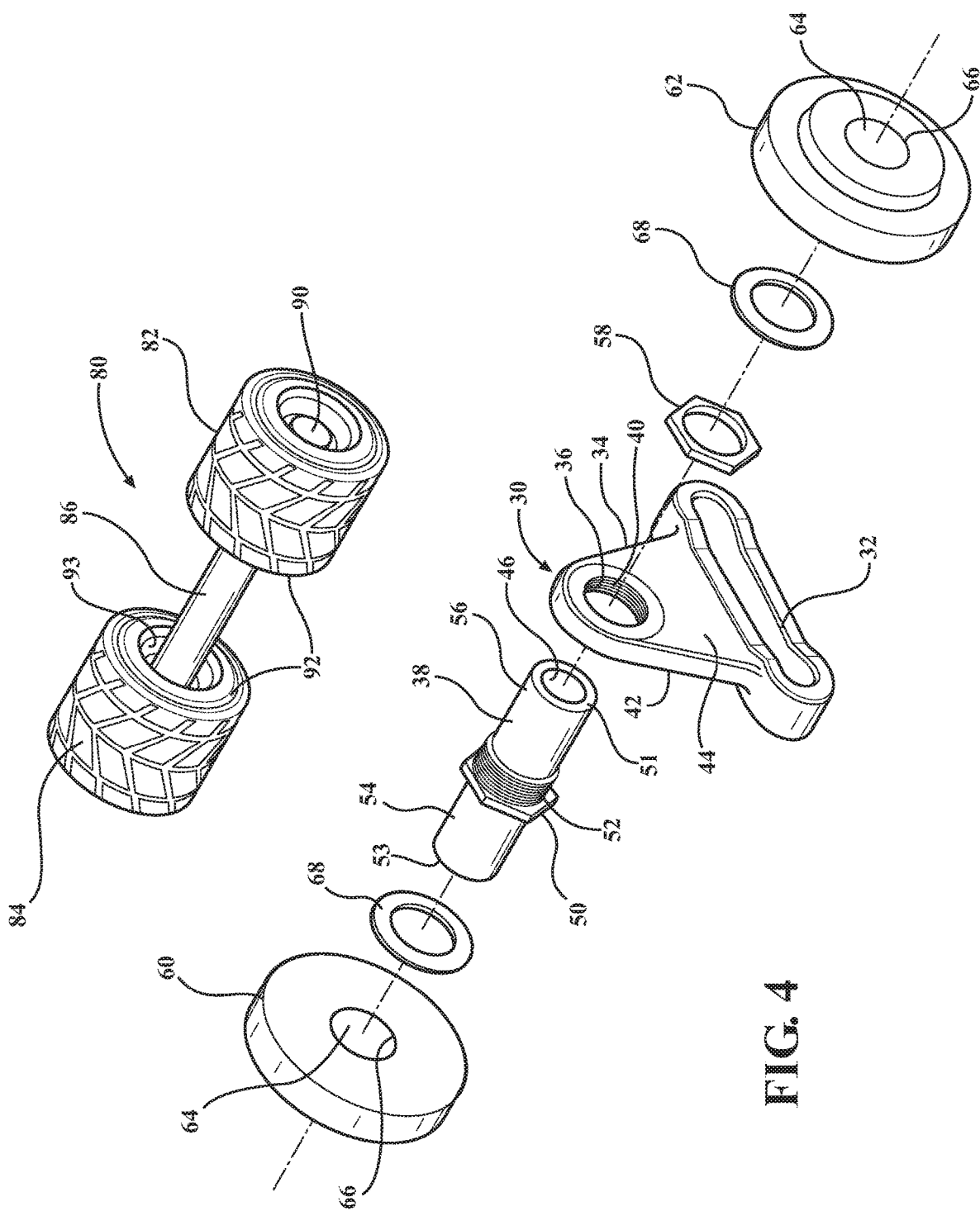
FIG. 4 is an exploded view of a dollie assembly for a vehicle wash in accordance with an aspect of the present disclosure.

FIGS. 1 through 4 illustrate a dollie assembly 10 for use with a conveyor system 12 in accordance with an aspect of the disclosure. As shown, the dollie assembly 10 can include a center link 30, which is adapted to be coupled to the endless loop chain 19 of the conveyor system 12. According to an aspect, the center link 30 can include a first connecting portion, also referred to as chain link connecting portion 32, configured for attachment to a drive mechanism (conveyor chain 19) of the car wash, and an upstanding upper flange providing a second connection portion, also referred to as shouldered portion 34, configured for operable connection of wheels thereto, as discussed hereafter. The shouldered portion 34 can include a throughhole 36 for receipt of a first roller bushing 38 therethrough. According to another aspect, the throughhole 36 may have internal threads 40 such that it can threadedly receive the roller bushing 38 in fixed attachment therein. According to an aspect, the center link 30 includes a first side 42 and a second side 44 and may be formed of a steal material as a forged structure. However, it will be appreciated that the center link 30 may be formed of a variety of different materials by a variety of different suitable processes, including a plastic material and including casting or molding, for example.

According to an aspect, the roller bushing 38 may include a radially outwardly extending shoulder member 50 located generally intermediate opposite ends 51, 53 of the roller bushing 38, such that shoulder member 50 generally bisects the roller bushing 38, though shown slightly offset from true center. The shoulder member 50 may be configured to abut one of the first and second sides 42, 44 of the center link 30, and shown as the first side 42 of the center link 30, by way of example and without limitation. The roller bushing 38 may also include region having external threads 52 that can threadedly engage the internal threads 40 in the throughhole 36 of the center link 30 to securely fix the roller bushing 38 to the center link 30 against relative movement therewith. It will be appreciated that the roller bushing 38 may be fixedly secured to the center link 30 in a variety of other suitable ways. According to another aspect, the roller bushing 38 may include a pair of opposing cylindrical bearing surfaces 54, 56 that are disposed on either side of the shoulder member 50 and which extend axially outwardly from either side 42, 44 of the center link 30, with the bearing surfaces 54, 56 extending about a central axis 57 from the shoulder member 50 toward the opposite ends 51, 53. Additionally, upon threading the roller bushing 38 into fixed relation with the center link 30 and bringing the first side 42 of the center link 30 into abutment with the shoulder 50, a nut 58 may be threadingly secured to the external threads 52 of the roller bushing 38, wherein the nut 58 can be brought into abutment with the second side 44 of the center link 30 to fixedly capture the center link 30 between the shoulder member 50 and the nut 58. While the roller bushing 38 may be formed of a plastic material, it will be appreciated that it may also be formed of a variety of other suitable materials, which can provide suitable bearing surfaces. According to an aspect, the externally threaded bushing 38 can include a cylindrical interior hollow through passage 46 extending along the central axis 57 through the opposite ends 51, 53.

According to an aspect, a large diameter tire pushing roller 60, 62 may be disposed on the respective outer bearing surfaces 54, 56 of the roller bushing 38 on either side of the center link 30. The tire pushing rollers 60, 62 are configured to ride in the slot 18 of the upper track 16 as they push the vehicle through the car wash, thereby securing the dollie assembly 10 against excessive lateral movement, thus, ensuring the dollie assemblies 10 remain properly positioned in abutment with the vehicle's tires to reliably push the vehicle through the car wash. Each of the tire pushing rollers 60, 62 can include a throughbore, also referred to as passageway 64, that serves as a rolling bearing surface 66. Each bearing surface 66 of the large diameter tire pushing rollers 60, 62 may be configured to be disposed on and engage a respective static bearing surface 54, 56 of the static roller bushing 38 for smooth, low friction rolling thereon. According to another aspect, a washer 68 may be disposed between the tire engaging rollers 60, 62 and the first and second sides 42, 44 of the center link 30 respectively. The large diameter tire pushing rollers 60, 62 may be formed of a polyurethane material, such as UHMW. However, the tire pushing rollers 60, 62 may be formed of a variety of other suitable materials.

According to a further aspect, the dollie assembly 10 can also include a dual track roller assembly 80. The dual track roller assembly 80 may include a pair of opposing track rollers 82, 84 that are fixedly attached to a central axle member 86 that extends along the central axis 57 between opposite ends 87, 89 such that the central axle member 86 and track rollers 82, 84 rotate together as a unit. As shown, the central axle member 86 may be slidingly and rotatably received within the interior passageway 46 of the roller bushing 38 with the opposite ends 87, 89 extending slightly axially outwardly beyond the opposite ends 51, 53 of the roller bushing 38 such that the central axle member 86 may rotate freely there within about the central axis 57. As shown, according to an aspect, the track rollers 82, 84 may be disposed on either end of the axle member 86 such that they are disposed axially outwardly from the tire pushing rollers 60, 62. An axle member, shown in the form of a bolt 88, by way of example and without limitation, may be passed through an interior hollow passage of the axle member 86 and through an interior hollow passage of second track roller bushings 91 disposed and fixed within track rollers 82, 84, with the bolt 88 having an enlarged head on one end with a locking nut 90 disposed at the other end to secure the track rollers 82, 84 to the axle member 86 to form the dual track roller assembly 80. The track rollers 82, 84 may have an inner side 92 with a counterbore 93 extending axially therein, such that each inner side 92 of the track rollers 82, 84 extends axially, in overlapping relation, beyond a respective end 51, 53 of the roller bushing 38 received in clearance relation within the counterbore 93. An annular seal member, such as an o-ring 94, may be employed between a cylindrical inner surface 96 of the counterbore 93 and a cylindrical outer surface of the roller bushing 38, shown as being received in annular grooves 95 in the roller bushing 38, to seal the interior of the roller bushing 38 against the ingress of water therein. It is contemplated that in addition to, or in lieu of the o-ring 94, other sealing arrangements may be employed, such as an annular oil seal or the like. Upon completing assembly of bolt 88 and nut 90, the track roller bushings 91 are brought into axial abutment with the ends 87, 89 of the roller bushing 86, such that the track roller bushings 91 and the roller bushing 38 can be fixed to co-rotate with one another and with track rollers 82, 84, while roller bushing 86 remains static in fixed relation with center link 30.

According to a further aspect the track rollers 82, 84 are configured to ride on the upper track 16a, 16b. According to yet another aspect, the track rollers 82, 84 can rotate independently of the tire pushing rollers 60, 62 such that in operation, the track rollers 82, 84 can rotate in opposite directions from the tire pushing rollers 60, 62. For example, the tire pushing rollers 60, 62 may be rotate in a direction opposite the direction of travel A as a result of contact with a vehicle wheel and the track rollers 82, 84 may rotate in a forward direction (i.e., with the direction of vehicle travel A). According to an aspect, this independent rotating arrangement can assist in minimizing sliding and skidding friction between the track rollers 82, 84 and the track 16a, 16b. To the extent the track rollers 82, 84 wear, they can be readily and inexpensively replaced without having to replace the more expensive track 16. Additionally, the track rollers 82, 84 and the tire pushing rollers 60, 62 can rotate with respect to the roller bushing 38, and individually with respect to one another. According to an aspect, as these structures can be constructed of a plastic material, wear can be minimized due to their rotational contact. In other words, such a configuration results in plastic on plastic contact.

According to an aspect, the static roller bushing 38 configuration of the dual track roller assembly 80 can provide significant benefits over the dynamic bushing arrangement of prior dollie configurations. This includes a reduction of the impact of dirt to prolonged wear, resulting in longer component and track life as well as reduced cost.

FIGS. 5 through 8 illustrate a track roller 182 according to another aspect of the present disclosure, wherein the same reference numerals as used above, offset by a factor of 100, are used to identify like features. The track roller 182 is functionally similar to the track roller 82; however, the track roller 182 includes a central hub assembly, provided including a pair of hub members 70, 72. The hub members 70, 72 are configured for insertion into opposite sides of a through bore 74 of the rubber material of the track roller 182. The hub members 70, 72 are configured to support a bushing 191, with the bushing 191 being shown fixed between annular bosses 76. It is contemplated herein that the bushing 191 could be otherwise fixed to the hub members 70, 72. The bushing 191 is provided to function similarly as the bushing 91 discussed above, and thus, no further description is believed necessary. With the track roller 182 having the hub members 70, 72, less rubber material is needed to form the track roller 182. The hub members 70, 72 can be constructed of any suitable high strength, rigid material, including plastics or metals.

According to another aspect aspect, the track rollers 82, 182 (it is to be recognized that the same details hereafter apply to the track roller 84) may be formed of a vulcanized urethane rubber material and can include a tread pattern 100 formed on an outer surface thereof. According to another aspect, the tread pattern 100 may consist of one or more circumferential grooves, also referred to as channels 102, that extend generally around the circumference of the roller 82. The tread pattern 100 can also include a plurality of radial channels 104 that project from and connect with circumferential channels 102. The plurality of radial channels 104 may be oriented at a rearward angle with respect to the vehicle direction of travel and can extend to the side edge of the track roller 82, 182 to provide dirt and water a place to reside and flow without becoming embedded in the surface engaging the upper track 16a, 16b. The tread pattern 100 can prevent dirt on the track member from getting embedded in urethane rubber or preventing the track roller from sliding in response to contact with the upper track 16. The configuration of the tread pattern 100 can also serve to funnel dirt and water toward the roller circumference to give the debris a place to go and minimize friction between the track roller 82, 182 and the track 16a, 16b. According to another aspect, the track rollers 82, 84, 182 may be colored black in order to match the color of vehicle tires. It will also be appreciated that a variety of other materials and tread patterns may be employed.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups or combinations thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A dollie assembly for a vehicle wash, comprising:
    a center link having a first connecting portion configured for attachment to a drive mechanism of the vehicle wash and a second connection portion having a throughhole;
    a first bushing disposed in said throughhole, said first bushing extending along a central axis between opposite ends and having cylindrical bearing surfaces on opposite sides of said center link;
    a pair of tire pushing rollers having a first diameter, one of said tire pushing rollers being disposed on one of said bearing surfaces for rotation about said central axis on one side of said center link and the other of said tire pushing rollers being disposed on the other of said bearing surfaces for rotation about said central axis on the other side of said center link; and
    a pair of track rollers having a second diameter less than said first diameter, said pair of track rollers being supported for rotation about said central axis, each of said track rollers being disposed on an opposite side of said pair of tire pushing rollers from one another such that said pair of tire pushing rollers are between said pair of track rollers, wherein said pair of track rollers are rotatable about said central axis independently from said pair of tire pushing rollers.

2. The dollie assembly of claim 1, wherein said pair of tire pushing rollers are rotatable independently from one another.

3. The dollie assembly of claim 2, wherein said pair of track rollers are rotatable independently from one another.

4. The dollie assembly of claim 1, wherein said pair of track rollers are constructed of a rubber material.

5. The dollie assembly of claim 4, wherein said pair of track rollers have a tread pattern to facilitate avoidance of debris from becoming embedded in said track rollers.

6. The dollie assembly of claim 1, wherein said first bushing has a through passage extending along said central axis and further including a first axle member disposed through said through passage, said first axle member being configured to rotate relative to said first bushing.

7. The dollie assembly of claim 6, further including second bushings disposed in said pair of track rollers, said second bushings being configured to co-rotate with said first axle member.

8. The dollie assembly of claim 6, wherein said pair of track rollers have inner sides facing said tire pushing rollers, with each of said inner sides having a counterbore, and each of said opposite ends of said first bushing being disposed in a separate one of said counterbores.

9. The dollie assembly of claim 8, wherein said pair of track rollers are maintained in clearance relation with said first bushing.

10. The dollie assembly of claim 8, further including a seal member disposed between an outer surface said first bushing and an inner surface of each of said counterbores.

11. The dollie assembly of claim 10, wherein said seal members are disposed in annular grooves of said bushing.

12. The dollie assembly of claim 1, wherein said track rollers rotate about the central axis via an internal bearing surface defined by the first bushing, and said tire pushing rollers rotate about the central axis via said cylindrical bearing surfaces of the first bushing.

13. A dollie assembly for a vehicle wash, comprising:
    a center link having a first connecting portion configured for attachment to a drive mechanism of the vehicle wash and a second connection portion having a throughhole;
    a first bushing fixed in said throughhole against relative movement with said center link, said first bushing having a through passage extending along a central axis between opposite ends and having cylindrical bearing surfaces on opposite sides of said center link;
    an axle member disposed through said through passage;
    a pair of tire pushing rollers having a first diameter, one of said tire pushing rollers being disposed on one of said bearing surfaces for rotation about said central axis on one side of said center link and the other of said tire pushing rollers being disposed on the other of said bearing surfaces for rotation about said central axis on the other side of said center link; and
    a pair of track rollers having a second diameter less than said first diameter, said pair of track rollers being supported for rotation about said axle member and about said central axis, each of said track rollers being disposed on an opposite side of said pair of tire pushing rollers from one another such that said pair of tire pushing rollers are between said pair of track rollers, wherein said pair of track rollers are rotatable about said central axis independently from said pair of tire pushing rollers.

14. The dollie assembly of claim 13, wherein said axle member is rotatable relative to said first bushing.

15. The dollie assembly of claim 13, further including second bushings disposed in said pair of track rollers, said second bushings being configured to co-rotate with said axle member.

16. The dollie assembly of claim 13, wherein said pair of track rollers have inner sides facing said tire pushing rollers, with each of said inner sides having a counterbore, and each of said opposite ends of said first bushing being disposed in a separate one of said counterbores.

17. The dollie assembly of claim 16, wherein said pair of track rollers are maintained in clearance relation with said first bushing.

18. The dollie assembly of claim 17, further including a seal member disposed between an outer surface said first bushing and an inner surface of each of said counterbores.

19. The dollie assembly of claim 13, wherein the pair of track rollers are constructed of a rubber material.

20. The dollie assembly of claim 19, wherein the track rollers have a tread pattern to minimize the embedding of debris in the track rollers.

21. A dollie assembly for a vehicle wash, comprising:
a center link having a first connecting portion configured for attachment to a drive mechanism of the vehicle wash and a second connection portion having a throughhole;
a first bushing fixed in said throughhole against relative movement with said center link, said first bushing having a through passage extending along a central axis between opposite ends and having cylindrical bearing surfaces on opposite sides of said center link;
a pair of tire pushing rollers having a first diameter, one of said tire pushing rollers being disposed on one of said bearing surfaces for rotation about said central axis on one side of said center link and the other of said tire pushing rollers being disposed on the other of said bearing surfaces for rotation about said central axis on the other side of said center link; and
a pair of track rollers having a second diameter less than said first diameter, said pair of track rollers being supported for rotation about said central axis, each of said track rollers being disposed on an opposite side of said pair of tire pushing rollers from one another such that said pair of tire pushing rollers are between said pair of track rollers, wherein said pair of track rollers are rotatable about said central axis independently from said pair of tire pushing rollers;
the pair of track rollers including a tread pattern to minimize any embedding of debris in said pair of track rollers.

22. The dollie assembly of claim 21, wherein the pair of track rollers are constructed of a rubber material.

23. The dollie assembly of claim 21, further including second bushings disposed in said pair of track rollers with a second axle member extending through said second bushings, said second bushings being configured to co-rotate with a first axle member that extends through the through passage of the first bushing.

24. The dollie assembly of claim 21, wherein said pair of track rollers have inner sides facing said tire pushing rollers, with each of said inner sides having a counterbore, and each of said opposite ends of said first bushing being disposed in a separate one of said counterbores.

25. The dollie assembly of claim 24, wherein said pair of track rollers are maintained in clearance relation with said first bushing.

26. The dollie assembly of claim 21, wherein said track rollers rotate about the central axis via an internal bearing surface defined by the first bushing, and said tire pushing rollers rotate about the central axis via said cylindrical bearing surfaces of the first bushing.

* * * * *